United States Patent
Weniger et al.

(10) Patent No.: US 8,230,076 B2
(45) Date of Patent: Jul. 24, 2012

(54) METHOD AND APPARATUS FOR SIMULTANEOUS LOCATION PRIVACY AND ROUTE OPTIMIZATION FOR COMMUNICATION SESSIONS

(75) Inventors: Kilian Weniger, Langen (DE); Jens Bachmann, Langen (DE); Jon Schuringa, Langen (DE)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 12/302,826

(22) PCT Filed: May 24, 2007

(86) PCT No.: PCT/EP2007/004635
§ 371 (c)(1),
(2), (4) Date: Mar. 5, 2009

(87) PCT Pub. No.: WO2007/137765
PCT Pub. Date: Dec. 6, 2007

(65) Prior Publication Data
US 2009/0168698 A1    Jul. 2, 2009

(30) Foreign Application Priority Data

May 29, 2006  (EP) .................................. 06011019
Jul. 6, 2006   (EP) .................................. 06014072
Oct. 24, 2006  (EP) .................................. 06022260

(51) Int. Cl.
*G06F 15/16* (2006.01)
*H04W 4/00* (2009.01)

(52) U.S. Cl. ......... 709/227; 709/228; 709/229; 370/328

(58) Field of Classification Search .................. 709/227, 709/228, 229; 370/328
See application file for complete search history.

(56) References Cited

U.S. PATENT DOCUMENTS 7,352,743 B2 *   4/2008   Hameleers et al. ........... 370/389
(Continued)

FOREIGN PATENT DOCUMENTS
EP         1 442 579         11/2005
(Continued)

OTHER PUBLICATIONS

European Office Action dated Oct. 20, 2009.
(Continued)

*Primary Examiner* — Peter-Anthony Pappas
*Assistant Examiner* — Umar Cheema
(74) *Attorney, Agent, or Firm* — Dickinson Wright PLLC

(57) ABSTRACT

The invention relates to a method for routing packets in a system of packet-switched networks comprising a plurality of home agents, at least one mobile node and at least one correspondent node, the mobile node having at least a first home address and communicating with the correspondent node over a first of the plurality of home agents. The method comprises the following steps carried out by the mobile node: receiving an application layer request message from the correspondent node; looking up a correspondent node address in a part of the application layer request message; locating a second of the plurality of home agents in proximity to a direct path between the mobile node and the correspondent node using the correspondent node address; bootstrapping with the second home agent to obtain a second home address; including the second home address in a part of an application layer response message to the correspondent node to enable the correspondent node to use the second home address for data communications with the mobile node.

23 Claims, 12 Drawing Sheets

U.S. PATENT DOCUMENTS

| | | | |
|---|---|---|---|
| 7,539,857 B2* | 5/2009 | Bartlett et al. | 713/152 |
| 2004/0039825 A1* | 2/2004 | Bennett | 709/227 |
| 2004/0105420 A1 | 6/2004 | Takeda | |
| 2004/0165594 A1* | 8/2004 | Faccin et al. | 370/395.2 |
| 2004/0236937 A1 | 11/2004 | Perkins | |
| 2005/0041675 A1 | 2/2005 | Trostle | |
| 2006/0018299 A1 | 1/2006 | Yamamoto | |
| 2006/0230154 A1* | 10/2006 | Nguyenphu et al. | 709/227 |

FOREIGN PATENT DOCUMENTS

| | | |
|---|---|---|
| EP | 1 605 662 | 12/2005 |
| GB | 2 412 543 | 9/2005 |
| WO | 01/72007 | 9/2001 |
| WO | 03/041358 | 5/2003 |
| WO | 03/044626 | 5/2003 |
| WO | 2004/010668 | 1/2004 |
| WO | 2004/043010 | 5/2004 |
| WO | 2004/055993 | 7/2004 |
| WO | 2005/046132 | 5/2005 |

OTHER PUBLICATIONS

International Search Report dated Oct. 8, 2007.

European Search Report dated Sep. 27, 2007.

D. Johnson, et al., "Mobility Support in IPv6," Network Working Group, IETF RFC3775, Standards Track, Jun. 2004, pp. 1-165.

R. Zheng, et al. "A Case for Mobility Support with Temporary Home Agents," Computer Communications and Networks, 2001, Proceedings, Tenth International Conference on Oct. 15-17, 2001, Piscataway, NJ, IEEE, pp. 226-233.

G. Giaretta, et al., "Mobile IPv6 bootstrapping in split scenario draft-ietf-mip6-bootstrapping-split-02.txt," MIP6 WG, Internet Draft, Mar. 3, 2006, pp. 1-33.

H. Soliman, et al., "Hierarchical Mobile IPv6 Mobility Management (HMIPv6)," Network Working Group, IETF RFC 4140, Aug. 2005, pp. 1-29.

G. Krishnamurthi, et al., "Providing End-to-End Location Privacy in IP-based Mobile Communication," IEEE, WCNC, Mar. 2004, pp. 1264-1269.

R. Wakikawa, et al. "Optimized Route Cache Protocol (ORC) draft-wakikawa-nemo-orc-01.txt," Internet Draft, Oct. 24, 2005, pp. 1-22.

P. Thubert, et al., "Global HA to HA protocol draft-thubert-nemo-global-haha-00," Network Mobility, Internet Draft, Oct. 5, 2004, pp. 1-18.

J. Zhang, et al., "Agent-Based Return Routability Test for Mobile IPv4 Route Optimization draft-zhang-mobopts-agent-mip4rr-00.txt," Internet Draft, Aug. 10, 2005, pp. 1-17.

C. Castelluccia, et al. "A Simple Privacy Extenetion for Mobile IPv6 draft-dupont-mip6-privacyext-02.txt," Network Working Group, Internet-Draft, Jul. 11, 2005, pp. 1-10.

J. Rosengerg, et al., "SIP: Session Initiation Protocol," Network Working Group, RFC3261, Standards Track, Jun. 2002, pp. 1-269.

M. Handley, et al., "SDP: Session Description Protocol," Network Working Group, RFC4566, Standards Track, Jul. 2006, pp. 1-49.

\* cited by examiner

METHOD AND APPARATUS FOR SIMULTANEOUS LOCATION PRIVACY AND ROUTE OPTIMIZATION FOR COMMUNICATION SESSIONS

FIELD OF THE INVENTION

The invention relates to optimized routing and location privacy in mobile packet-based communication networks.

This invention describes a method and system that enables a Mobile IPv6 (Internet Protocol version 6) mobile node to hide its location from a correspondent node and at the same time provides optimized routing of data packets; a mobile node enabled to hide its location from a correspondent node and at the same time provide optimised routing of data packets; and a computer readable medium that enables a Mobile IPv6 (Internet Protocol version 6) mobile node to hide its location from a correspondent node and at the same time provides optimized routing of data packets.

TECHNICAL BACKGROUND

Communications systems evolve more and more towards an Internet Protocol (IP)-based network. They consist of many interconnected networks, in which speech and data is transmitted from one terminal to another terminal in pieces, so-called packets. Those packets are routed to the destination by routers in a connection-less manner. Therefore, packets consist of IP header and payload information and the header comprises among other things source and destination IP address. For scalability reasons an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

If a terminal is mobile, from now on called Mobile Node (MN), and moves between subnets, it must change its IP address to a topological correct one because of the hierarchical addressing scheme. However, since connections on higher-layers such as TCP connections are defined with the IP addresses (and ports) of the communicating nodes, the connection breaks if one of the nodes changes its IP address, e.g., due to movement.

Mobile IPv6 [D. Johnson, C. Perkins, J. Arkko, "Mobility Support in IPv6", IETF RFC 3775, June 2004] is an IP-based mobility protocol that enables MNs to move between subnets in a manner transparent for higher layers and applications, i.e. without breaking higher-layer connections. Therefore, a MN has two IP addresses configured: a Care-of-Address (CoA) and a Home Address (HoA). The MN's higher layers use the HoA for communication with the communication partner (destination terminal), from now on called Corresponding Node (CN). This address does not change and serves the purpose of identification of the MN. Topologically, it belongs to the Home Network (HN) of the MN. In contrast, the CoA changes on every movement resulting in a subnet change and is used as the locator for the routing infrastructure. Topologically, it belongs to the network the MN is currently visiting. One out of a set of Home Agents (HA) located on the home link maintains a mapping of the MN's CoA to MN's HoA and redirects incoming traffic for the MN to its current location. Reasons for having a set of HAs instead of a single HA are redundancy and load balancing. The data communication session between a specific CN address and a specific MN HoA is called a Mobile IP data session.

Mobile IPv6 currently defines two modes of operation: bi-directional tunnelling and route optimization. If bi-directional tunnelling is used, data packets sent by the CN and addressed to the HoA of the MN are intercepted by the HA in the HN and tunnelled to CoA of the MN. Data packets sent by the MN are reverse tunnelled to the HA, which decapsulates the packets and sends them to the CN. For this operation, only the HA must be informed about the CoA of the MN. Therefore, the MN sends Binding Update (BU) messages to the HA. These messages are sent over an IPsec security association and thus are authenticated and integrity protected. Since the CN is not aware of the CoA of the MN, it cannot derive the location of the MN and, thus, location privacy is provided. However, if the MN is far away from the home network and the CN is close to the MN, the communication path is unnecessarily long, resulting in inefficient routing and high packet delays (see FIG. 1).

Recently, Mobile IPv6 has been extended to enable MNs to dynamically bootstrap with HAs [G. Giaretta, J. Kempf, V. Devarapalli, "Mobile IPv6 bootstrapping in split scenario", draft-ietf-mip6-bootstrapping-split-02.txt, March 2006]. Bootstrapping includes discovering a HA, configuring a corresponding HoA, and setting up IPsec security associations with this HA. Since manual configuration of mobile nodes is neither practical and nor scalable, it can be assumed that Mobile IPv6 will be deployed with the bootstrapping extension, especially in large scale deployments. The bootstrapping extensions enables a MN to bootstrap with a local HA to optimize the route in bi-directional tunnelling mode. However, this potentially breaks location privacy support, since the HoA (which is usually known by CN) now contains location information. For instance, if the CN knows that the HA is local to the MN (e.g., it is the operator's policy to bootstrap with local HAs), it can deduce the MN's location based on the MN's HoA. Furthermore, changing the HA by bootstrapping requires changing the HoA, which means that ongoing data sessions would break. Hence, route optimization of ongoing data sessions is not supported.

Note that different aspects of location privacy can be distinguished. The one this invention aims at is hiding the MN's location to the CN. Other aspects are hiding the location to eavesdroppers or preventing tracking of the MN's location.

The route optimization mode can prevent the inefficiency of bi-directional tunnelling mode by using the direct path between CN and MN (see FIG. 1). Therefore, the MN sends BU messages to the CN, which then is able to directly send data packets to the MN (a type 2 routing header is used to send the packets on the direct path). Of course, the CN has to implement Mobile IPv6 route optimization support. To authenticate the BU message, the MN and the CN perform a so-called return routability procedure, which tests the reachability of the MN at the HoA and CoA and generates a shared session key (see below). However, since the CN learns the CoA of the MN by means of the BU message, it can derive its location, i.e. location privacy is not provided.

In the following, prior art documents that can provide route optimization or location privacy to some extent are discussed and the drawbacks of those solutions shown.

HMIP [Hesham Soliman, Claude Catelluccia, Karim El Malki, Ludovic Bellier, "Hierarchical Mobile IPv6 mobility management (HMIPv6)", IETF RFC4140, August 2005] was developed to reduce the latency and signalling overhead occurring due to sending BU messages to a (potentially far away) HAs. It is proposed to handle the mobility partly locally. Therefore, a hierarchy of Mobility Anchor Points (MAP) is introduced in the visited network. The MN only needs to register its CoA with the local MAP. An additional CoA, the so-called Regional CoA (RCoA), is obtained from the MAP's subnet and used by the MAP to hide the MN's mobility within the MAP's region from the HA (or the CN in case of route optimization). Furthermore, MN can start Route Optimization mode using the RCoA as CoA. Hence, some support for simultaneous route optimization and location privacy can be provided, but since CN still knows the RCoA and hence the MAP region the MN is currently located in, location privacy support is very limited.

AREC [WO2004055993; as well as G. Krishnamurthi, H. Chaskar, R. Siren, "Providing End-to-End Location Privacy in IP-based Mobile Communication", IEEE WCNC, March 2004] requires modification of every Access Router (AR) of every visited network. Binding information is sent from HAs to ARs of the CN and MN, respectively, and data packets are tunnelled between the ARs of MN and CN without involvement of the HAs. This way, the direct, i.e. shortest, route between MN and CN is used and location privacy is supported. In WO2004010668 a very similar approach is presented. However, security issues arise due to the dissemination of binding information to ARs and the distribution of binding information from the HAs to the ARs requires a new complex protocol, which would have to be standardized and which would have to be universally deployed to be useful.

ORC [Ryuji Wakikawa, "Optimized Route Cache Protocol (ORC)", Internet Draft draft-wakikawa-nemo-orc-01.txt, October 2004] was developed for route optimization in mobile networks (NEMO) and requires modifications to edge routers of visited networks, including the provision of binding information. The MN tunnels data packets to the edge router of CN's current network (assuming that CN is mobile) and the CN can tunnel data packets to the edge router of MN's current visited network. To be able to tunnel the packets to the edge routers, each node needs to know the IP address of the correspondent edge router. Security issues arise and a new protocol has to be standardize, which would have to be universally deployed to be useful. Furthermore, simultaneous location privacy and optimized routing is only supported, if the modified edge router is deployed in CN's network and if this router is located on the direct path between MN and CN.

GlobalHAHA [P. Thubert, R. Wakikawa, V. Devarapalli, "Global HA to HA protocol", IETF Internet Draft draft-thubert-nemo-global-haha-00, October 2004] allows the distribution of HAs in the Internet that are usually bound to the home link by letting multiple HAs advertise routes to the home network prefix from different topological locations. A MN can bind to the closest HA, which serves as proxy HA, resulting in an optimized route. Location privacy is given, if bi-directional tunnelling is used. Hence, simultaneous route optimization and location privacy is provided. However, if all visited network advertise routes to all other networks (all being home networks for some MNs), routing scalability issues may arise, since the address hierarchy is basically not given anymore. Furthermore, the distributed home network must manually be configured as such. A secure on-demand configuration is not supported and would require a new complex protocol, which would need to be standardized and would have to be universally deployed to be useful.

In WO03041358 so-called Location Privacy Agents (LPA) and Location Privacy Servers (LPS) are introduced in every network. The MN sends a location privacy request message to its LPA, which then selects an LPA that is close to the CN. The address of this LPA is then given to the MN, which then sends a BU message to this LPA. Hence, the approach is similar to the ORC approach: since the LPA is close to CN's network, it knows the location of CN to some extend, which breaks location privacy support if the CN is mobile. Moreover, this solution would require a new signalling protocol and introduces new entities.

In US2005041675 and WO2004043010 location privacy is achieved by cryptographically modified prefixes of IP addresses. Since the prefix is usually used by a router to route IP packets, this approach requires the modification of all routers in the Internet, which is not a realistic option, or can only provide very limited location privacy.

In WO03044626, multicast addresses are used as CoA. Since they do not include any location information, location privacy support is given even in route optimization mode. However, this solution does not scale with the number of MNs, since a large-scale deployment would result in a flat routing in the Internet.

Mechanisms such as proposed in US20040236937 only deal with hiding the MN's identity and hence also location from eavesdroppers. It cannot hide the MN's location from CN and hence doesn't solve the given problem.

In J. Zhang and D. Pearce ("Agent-Based Return Routability Test for Mobile IPv4 Route Optimization", IETF Internet Draft draft-zhang-mobopts-agent-mip4rr-00.txt, August 2005), it is proposed to adopt the MIPv6 route optimization scheme for MIPv4 route optimization. A Correspondent Agent (CA) is introduced that proxies the CN in terms of return routability. This way the CN implementation does not need to be modified and data packets can directly be tunnelled between MN and CA. A side effect of the CA is that MN's location is hidden from CN. This approach is similar to ORC. Hence, security issues arise, a new protocol has to be standardized, and a CA has to be introduced. Furthermore, simultaneous location privacy and optimized routing is only supported, if a CA is deployed in CN's network and if this CA is located on the direct path between MN and CN.

Finally, C. Castelluccia, F. Dupont and G. Montenegro ("A Simple Privacy Extension for Mobile IPv6", draft-dupont-mip6-privacyext-02.txt, July 2005) propose to replace the HoA by a Temporary Mobile Identifier (TMI). If the MN initiates the session, it can thus hide the HoA from CN and only reveal the TMI. Although CN learns the MN's CoA, it doesn't reveal the MN's location since CN doesn't know the real identity corresponding to the CoA. However, for the CN to be able to initiate communication with the MN, the CN must know the MN's HoA and hence location privacy is not provided in such scenarios (note that the HoA cannot be changed to keep higher-layer sessions alive).

Often, communication session establishment requires signaling on the application layer. A popular protocol that is used for this purpose (e.g., by VoIP applications) is the Session Initiation Protocol (SIP) (J. Rosenberg et al, SIP: Session Initiation Protocol, RFC3261, June 2002). An example of session establishment signalling using SIP between a MN and a CN is shown in FIG. 10. The example shows a simplified signalling flow for the sake of clarity. If, for instance, IMS (IP Multimedia Subsystems) is used, more signalling messages are sent, e.g. for resource reservation and charging reasons.

SIP defines new infrastructure entities: Each SIP node has assigned a SIP registrar or proxy server, to whom it is registered and to/from whom it usually sends/receives SIP signalling messages. To establish a session with a CN, the MN sends an Invite message to its proxy server. The Invite message contains a description of the session, such as media type, transport protocol, addresses and ports for the session. The Invite message must also contain the SIP Unified Resource Identifier (URI) of the correspondent node. The SIP URI could, e.g., be "Bob@domain.com". The description is usually carried by the Session Description Protocol (SDP) [M.

Handley et al, SDP: Session Description Protocol, RFC 4566, July 2006]. SDP in SIP follows an offer-answer-model, which means that one node offers media type, codecs etc., and the other node accepts or rejects the offer. SDP offers and answers can be appended to various SIP messages. MN's proxy server discovers proxy server of CN using the SIP URI and DNS and sends the Invite message to this proxy. CN's proxy knows CN's address from a previous registration message sent by CN and forwards the Invite message to CN. The receipt of this message triggers a notification of the user, e.g., by a ring tone. At the same time, CN sends a notification back to MN, which is routed on the reverse path over the proxy servers. When the user picks up the call, CN sends an OK message back to the MN. The SDP answer, which also includes the CN address, can be appended to any of the reply messages, e.g., the Ringing or the Ok Invite message. Furthermore, the contact field in the SIP header may contain the address of the sender endpoint. In any way, once the Ok Invite message is received, the addresses of the endpoints are known and the MN can start sending data to CN and vice versa without going over the proxies.

Efficient interworking of Mobile IP and application-layer signalling such as SIP is a problem on its own. Several solutions have been proposed, which are described in the following.

In WO2005046132 and EP1680894, an optimized operation of a system supporting both Mobile IP (MIP) and SIP is proposed. The basic idea is that the MN registers its HoA at the SIP server and that the MN informs the CN about its HoA by putting it in the contact field in the SIP header. Consequently, data corresponding to the SIP session is routed to MN's HoA and can be delivered to the MN even when the MN has moved. Furthermore, no SIP signaling is required on network-layer handovers of the MN.

US20040165594 describes a method for optimized interworking between Mobile IP and SIP, when Mobile IP route optimization is used. The idea is to trigger Mobile IP route optimization already during the SIP signaling flow, more specifically when the MN learns the address of the CN from received the SIP messages. Due to this cross-layer trigger from application-layer to network-layer, SIP and MIP route optimization signaling can occur at least partly concurrently and the optimized route may already be available for the first data packets, i.e., when the data session actually starts. However, since Mobile IP route optimization is used, location privacy cannot be provided by this method EP1605662 proposes a method for route optimization in a MIP-SIP-interworking scenario. Therefore, the MN registers both its HoA and CoA after a handover at the SIP server. Furthermore, the CN is informed about both addresses. This enables the setup of tunnels between CN and FA (Foreign Agent) and SIP server and FA or between MN and SIP server and MN and CN for optimized routing. However, this approach cannot provide location privacy and requires changes to FAs and SIP servers.

GB2412543 also considers the interworking of MIP and SIP. Here, it is proposed that the MN is triggered to register a new address at the SIP server after MIP or FMIP has detected a handover.

WO2001072007 propose that the MN will be paged by the network once a SIP Invite message for the MN sent by a CN is received at the SIP server. Next, the MN gets assigned an IP address and, finally, the SIP Invite message is delivered to the MN for establishing the session with the CN. Consequently, the state the network needs to maintain state about the MN's location is significantly reduced as long as the MN has no active communication sessions.

A mechanism that provides both location privacy and optimized routing is certainly desirable, since interactive applications such as VoIP require short packet delays. The mechanism should require only small changes to Mobile IPv6 message formats and implementations of Mobile IPv6 entities. Furthermore, it should support scenarios where the MN initiates the communication session as well as where the CN initiates the session.

The main problem to be solved is to hide the MN's location from CN and at the same time provide optimized routing of data packets. This shall be possible for communication sessions initiated by MN as well as by CN and shall only require minimal changes to Mobile IPv6. Moreover, location privacy support shall be unlimited, i.e., it shall neither be possible for the correspondent node to derive the link, nor the network or the domain, where the mobile node is currently located. The protocol and tunnelling overhead over the air and in the network is potentially large and an efficient way has to be found to support SIP-based services.

SUMMARY OF THE INVENTION

The present invention has been made in consideration of the above situation and has as its object to hide a mobile node's location from a correspondent node and at the same time provide optimised routing of data packets to this correspondent node, while considering the scenarios where application-layer signalling such as SIP is used for communication session establishment.

This object is solved by the subject matter of the independent claims. Advantageous embodiments of the invention are subject matters to the dependent claims.

To achieve this object the present invention provides a method, apparatus, system and computer-readable medium in a system of packet-switched networks comprising a plurality of home agents, at least one mobile node and at least one correspondent node, the mobile node having at least a first home address and communicating with the correspondent node over a first of the plurality of home agents, the method comprising the following steps carried out by the mobile node: receiving an application layer request message from the correspondent node; looking up a correspondent node address in a part of the application layer request message; locating a second of the plurality of home agents in proximity to a direct path between the mobile node and the correspondent node using the correspondent node address; bootstrapping with the second home agent to obtain a second home address; including the second home address in a part of an application layer response message to the correspondent node to enable the correspondent node to use the second home address for data communications with the mobile node.

In an advantageous embodiment the application layer request message is a session initiation protocol invite.

According to a further embodiment the step of locating comprises looking up the correspondent node address in a session description protocol part or in a contact field of the application layer request message.

In another advantageous embodiment the step of including the second home address in a part of an application layer response message comprises including the second home address in a session description protocol part or in a contact field of the application layer response message.

According to a further advantageous embodiment the application layer response message is a session initiation protocol 200 ok response.

In another advantageous embodiment a method, apparatus, system and computer-readable medium are provided for routing packets in a system of packet-switched networks comprising a plurality of home agents, at least one mobile node and at least one correspondent node, the mobile node having at least a first home address and communicating with the correspondent node over a first of the plurality of home agents, the method comprising the following steps carried out by the mobile node: sending a first application layer request message to the correspondent node; receiving an application layer response message from the correspondent node; looking up a correspondent node address in a part of the application layer response message; locating a second of the plurality of home agents in proximity to a direct path between the mobile node and the correspondent node using the correspondent node address; bootstrapping with the second home agent to obtain a second home address; informing the correspondent node to use the second home address for data communications with the mobile node.

In another advantageous embodiment the application layer response message is a session initiation protocol 180 ringing response.

According to a further aspect of the invention the step of informing the correspondent node comprises sending a session initiation protocol re-invite message or a session initiation protocol update message.

BRIEF DESCRIPTION OF THE FIGURES

Further features and advantages will become apparent from the following and more particular description of the various embodiments of the invention as illustrated in the accompanying drawings, wherein.

DETAILED DESCRIPTION OF THE INVENTION

Figure 1:
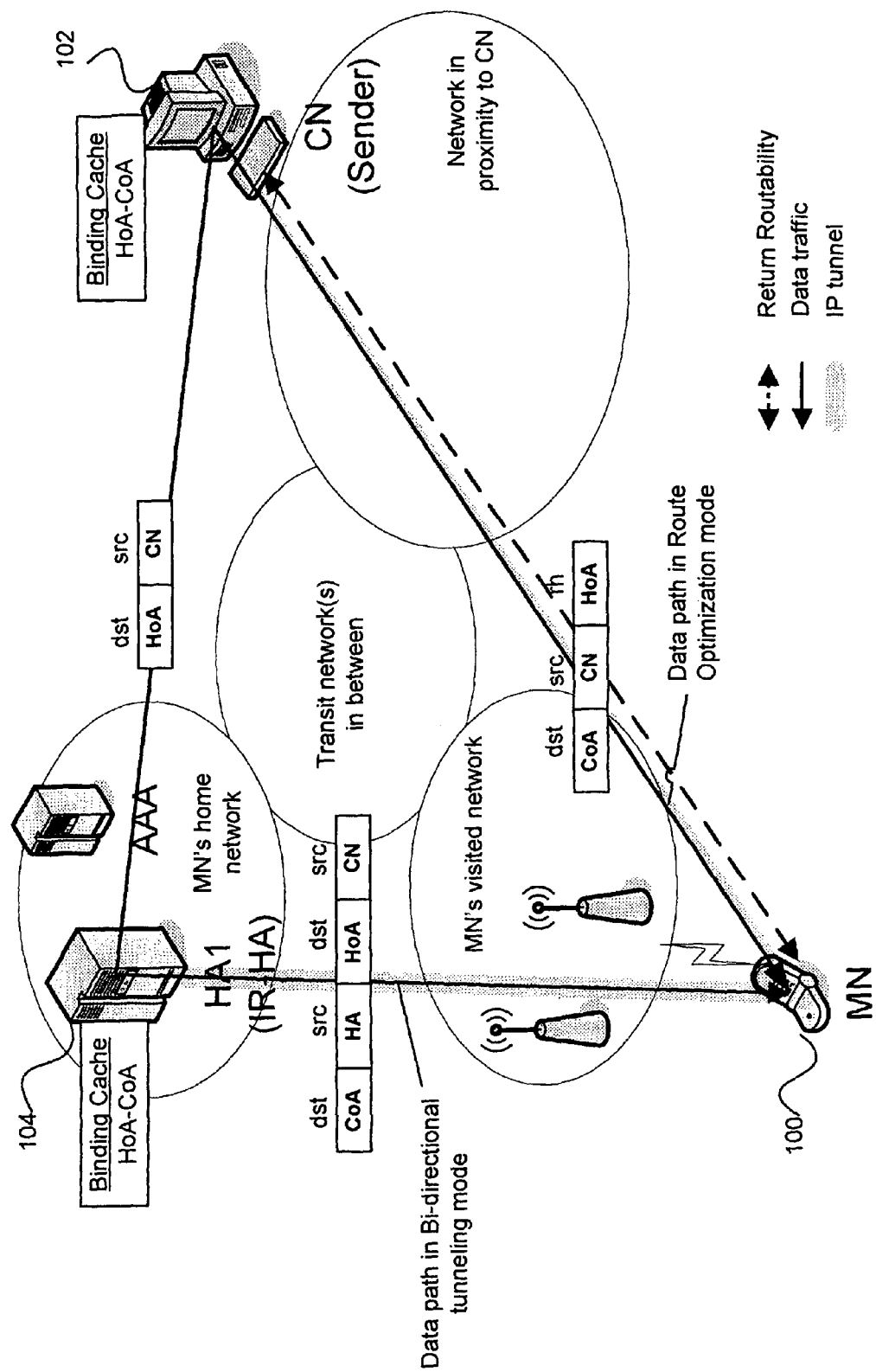
FIG. 1 shows the prior art data path and addresses in IP headers in Mobile IPv6 Bi-directional tunnelling and Route Optimization mode, respectively.

The following paragraphs will describe various embodiments of the invention including the procedure to solve the given problem, described for MN-initiated and CN-initiated sessions, respectively.

For exemplary purposes only, most of the embodiments are outlined in relation to a Mobile IPv6 communication system, and the terminology used in the subsequent sections mainly relates to the Mobile IPv6 terminology. However, the used terminology and the description of the embodiments with respect to a Mobile IPv6 architecture is not intended to limit the principles and ideas of the inventions to such systems.

Also, the detailed explanations given in the technical background section above are merely intended to better understand the mostly Mobile IPv6 specific exemplary embodiments described in the following, and should not be understood as limiting the invention to the described specific implementations of processors and functions in a Mobile IPv6 network.

The basic approach for location privacy followed by this invention is to hide the MN's CoA from CN. The first key idea of this invention is to discover and bootstrap with a HA, which is located close to the direct path between MN and CN, and use this HA in bi-directional tunnelling mode when communicating with the corresponding CN for providing optimized routing. In the MN-initiated scenario, this already solves the problem of simultaneous location privacy and optimized routing.

In the more challenging CN-initiated scenario this is not enough, since the MN usually does not know in advance that a CN will start sending data to the MN and which CN will do so. To solve the problem in this scenario, the main idea is to permanently keep being registered with a first HA and disclose the corresponding HoA to be reachable and be able to receive packets from CNs and, upon receiving first packets of a new communication session, bootstrap with a second HA and obtain a second HoA as described below to achieve optimized routing. In order to move the Mobile IP data session from the first HA to the second HA, the MN executes the route optimization mode over the bi-directional tunnel to the second HA and the CoA in route optimization mode is set to the second HoA. Using route optimization mode over bi-directional tunnelling and using a HoA (corresponding to the second HA) as CoA in CoT/CoTi/BU (Care-of Test/Care-of Test init/Binding Update) messages to CN is considered to be the second key idea of this invention.

This idea can also be used for purposes other than location privacy, such as HA load balancing, optimization of bootstrapping and multi-homing scenarios.

MN-Initiated Communication Sessions

To prevent revealing its CoA to CN and provide location privacy, the MN uses bi-directional tunnelling mode for communication with the CN. If the MN initiates the communication with the CN, it is free to choose a HA and a corresponding HoA for the communication with the CN, if it has multiple HAs and HoAs available. The idea to provide optimized routing is to discover and bootstrap with a HA which is located close to the direct path between MN and CN and use this HA in bi-directional tunnelling mode for communication with the CN.

Since a HA close to MN would add location information to the HoA and hence may break location privacy, the new HA should be rather close to CN. Another advantage of a HA located close to the CN is that it provides a short route even in the presence of heavy MN mobility. Since such a HA is primarily used for optimized routing with a specific CN, we call it "Route Optimization" (RO)-HA.

Bootstrapping is done as described in G. Giaretta, J. Kempf and V. Devarapalli ("Mobile IPv6 bootstrapping in split scenario", draft-ietf-mip6-bootstrapping-split-02.txt, March 2006) summarized above. The MN may be registered with one or more HAs before bootstrapping with the RO-HA.

One way to discover a RO-HA would be to use location-dependent HA discovery as mentioned in G. Giaretta, J. Kempf and V. Devarapalli ("Mobile IPv6 bootstrapping in split scenario", draft-ietf-mip6-bootstrapping-split-02.txt, March 2006). E.g., if the CN's host name is "cn.eu.panasonic.com", the MN may query DNS for "ha.eu.panasonic.com" or "_mip6._ipv6.eu.panasonic.com" to obtain a RO-HA address, in this case an address of an HA that is located in the same domain as the CN.

A second way to discover a RO-HA address is to use anycast-based HA discovery such as "Dynamic Home Agent Address Discovery (DHAAD)" as specified in RC3775. The MN would therefore send a request to an anycast address, which it constructs based on the CN's address prefix and a HA in CN's network would reply to this requests.

A third way is to introduce a dedicated network entity (server) that is able to map a CN address to one or more addresses of HAs which are located close to this CN (i.e., in the same or nearby domain or subnet) or a tuple of MN and CN address to one or more addresses of HAs which provide an optimized route (i.e., in a domain or subnet on or close to the direct path between MN and CN). These mappings can be pre-configured by the network operator or dynamically discovered, e.g., with the mechanisms described above. The MN would then send a request to this network entity and receive a reply with the RO-HA address.

Figure 2:
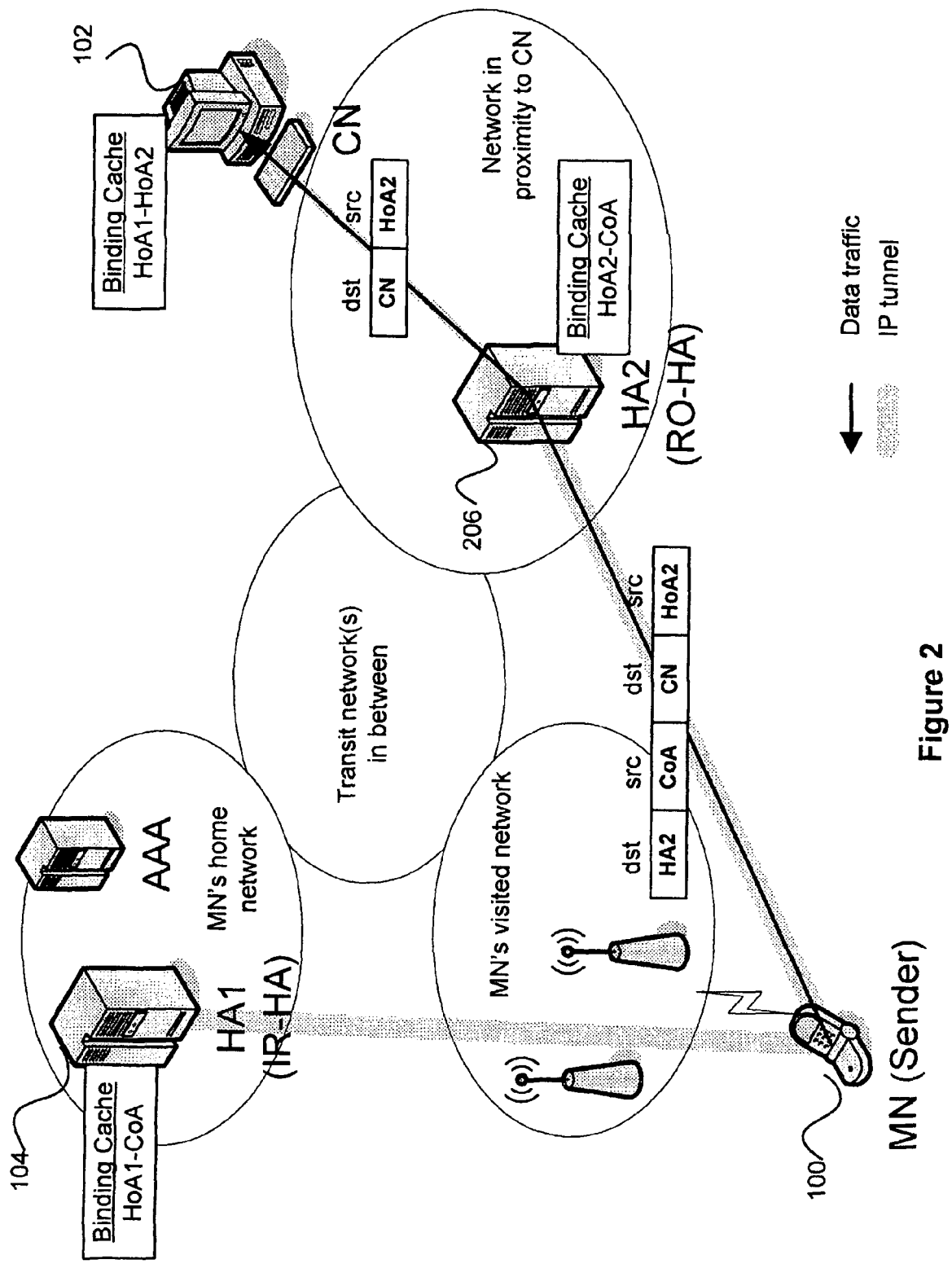
FIG. 2 depicts the data path and addresses in IP headers for MN-initiated session if MN sends data according to an embodiment of the invention.

FIG. 2 shows an example with data path and addresses in IP headers. The MN 100 was registered with HA1 104 and was configured with HoA1 before initiating communication with CN 102. After an application requests a communication session with CN 102, the MN 100 discovers and bootstraps with the RO-HA "HA2" 206, configures a corresponding HoA ("RO-HoA" or "HoA2") and uses it for communication with CN 102 in bi-directional tunnelling mode. Therefore, the MN 102 tunnels data packets to HA2 206, which decapsulates and sends them to CN 102.

Figure 3:
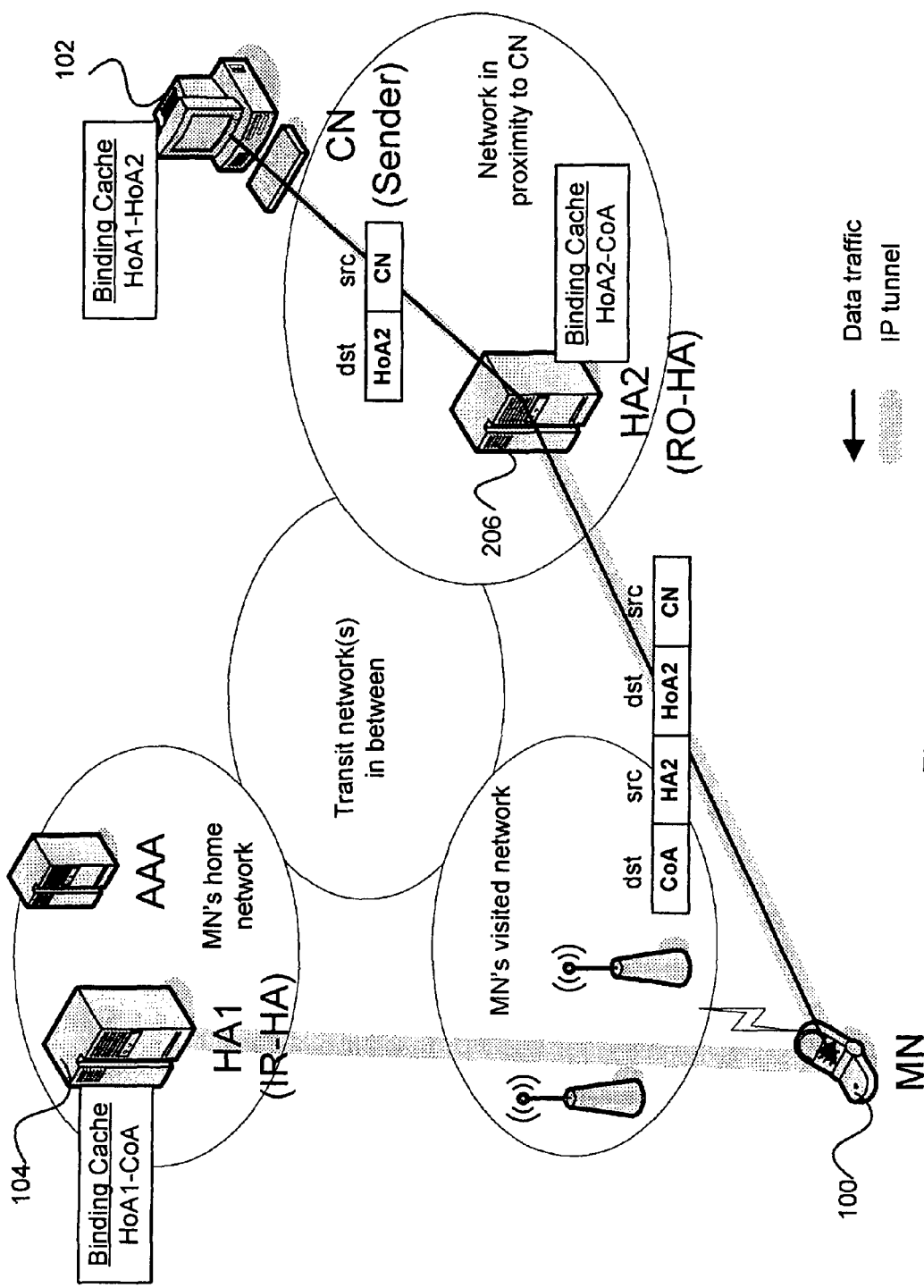
FIG. 3 shows the data path and addresses in IP headers for MN-initiated session if CN sends data according to an embodiment of the invention.

When CN (102) replies, it sends packets to MN's RO-HoA (HoA2) 206, which are routed to RO-HA (HA2) 206 and tunnelled to MN 100 (see FIG. 3). HoA1 104 is not used in this communication session.

For subsequent sessions with the same CN or with other CNs in this network or in nearby networks, the tunnel to the RO-HA can be re-used. Upon movement, the MN sends BU messages to HA1 as well as HA2.

Figure 8:
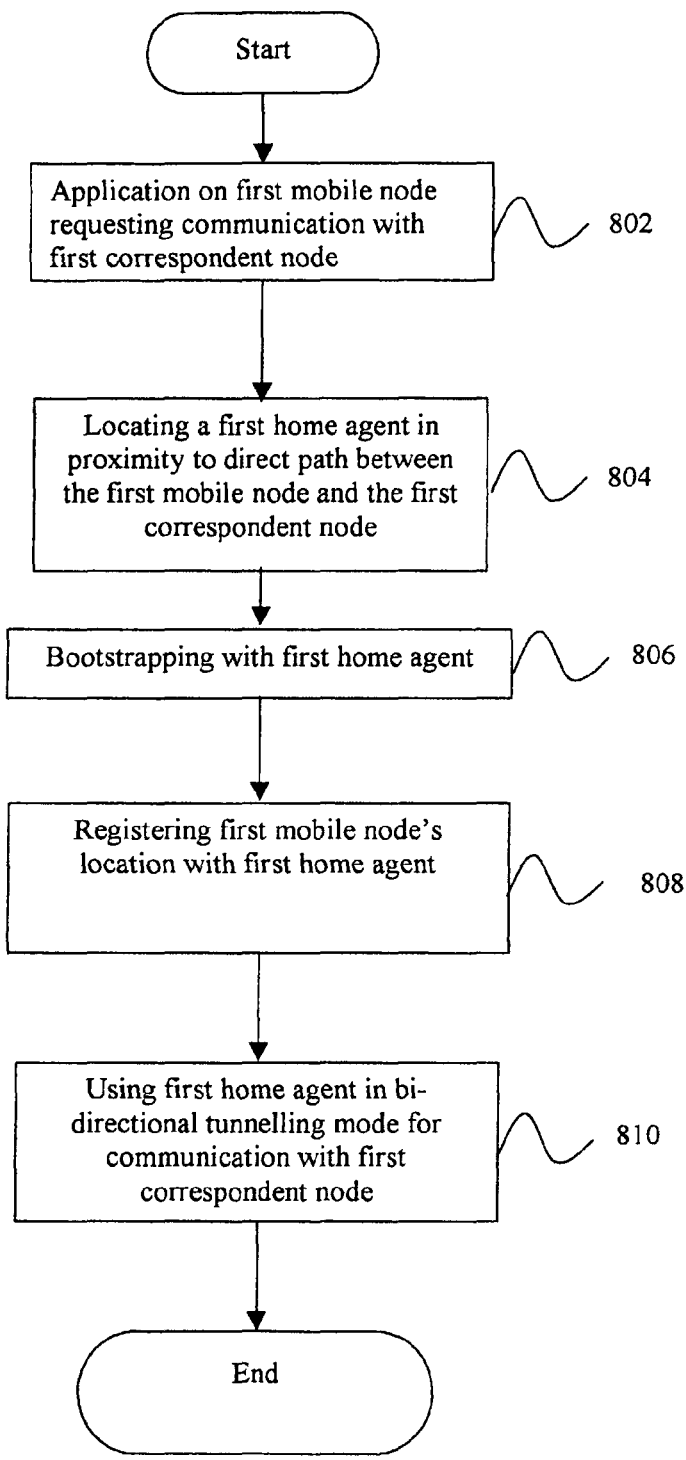
FIG. 8 is a block diagram of the MN initiated process according to an embodiment of the invention.

FIG. 8 describes the MN initiated method in form of a flow chart. In step 802 communication is requested. The mobile node then locates a first HA in proximity to the direct path between itself and the first CN in step 804. To do this the methods described above or other methods using a distance metric, such as Quality of Service (QoS), the number of hops and/or packet delays can be used. In step 806 the MN bootstraps with the HA. This includes that the IPsec security association is set up and the HoA is assigned before authentication and authorization with Mobility Service Authoriser (MSA) is carried out. In step 808 the MN's location is registered with the first home agent, which is then used in bi-directional tunneling mode for communication with the CN in step 810.

CN Initiated Communication Sessions

An active MN which is not at home is registered with at least one HA. The MN's HoA corresponding to this HA must be known by a CN to be reachable by this CN. This can, e.g., be achieved by publishing the HoA in DNS (Domain Name Server). Since this HA is mainly used by the MN to be reachable, it is from now on called IP-Reachability (IR)-HA (HA1 in FIG. 5). In the CN-initiated case, the CN selects one of MN's IR-HoAs (i.e., HoAs belonging to one of the MN's IR-HAs), e.g., by querying DNS with the MN's host name, to contact the MN. Hence, the MN cannot select a HoA by itself and the corresponding IR-HA may not provide a short route.

Figure 4:
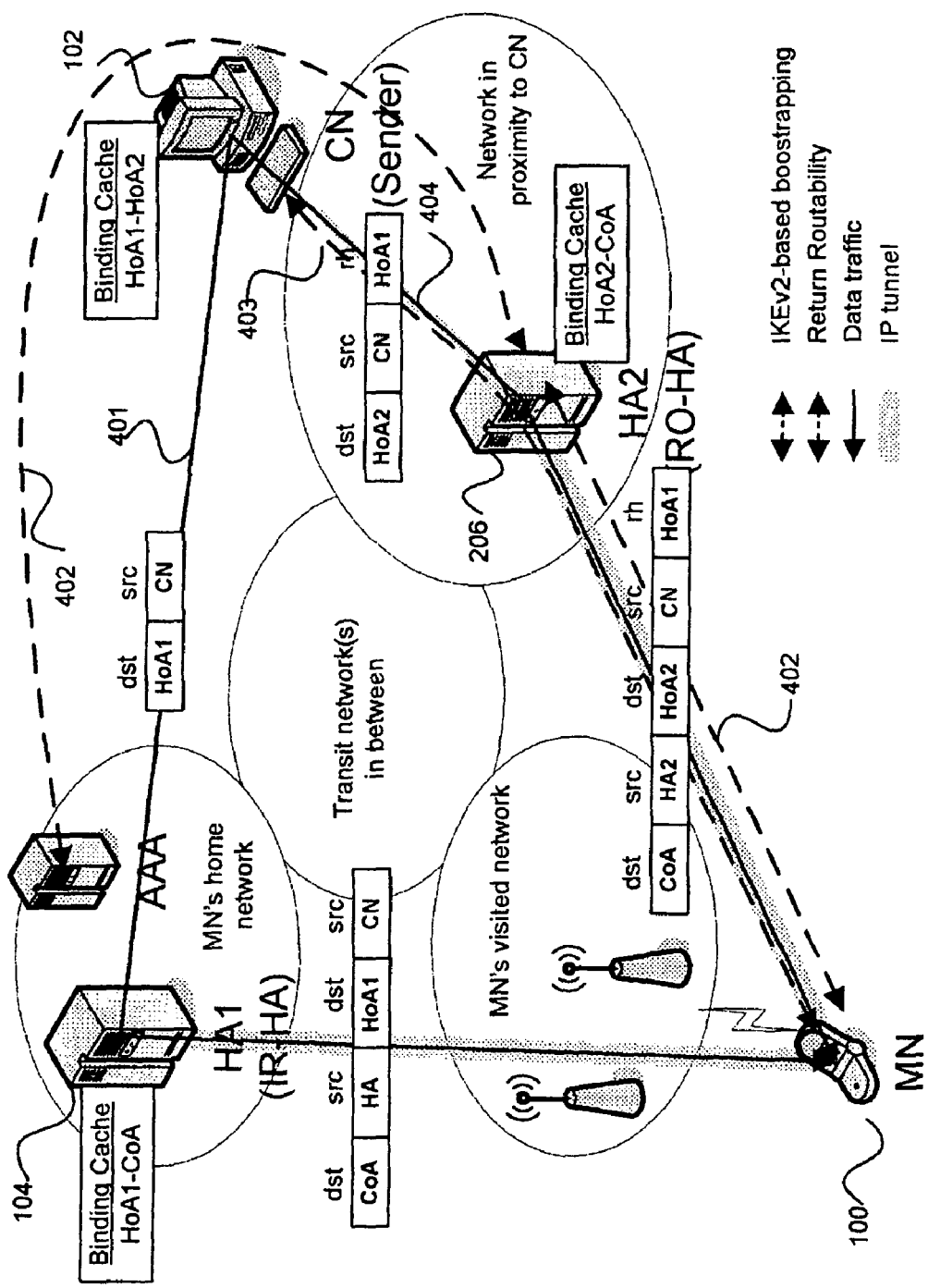
FIG. 4 shows the data path and addresses in IP headers for CN-initiated session if CN sends data according to an embodiment of the invention.

After first data packets from a CN are received by MN 100 over the IR-HA 104 (step 401 in FIG. 4), the MN 100 may decide to optimize the route (e.g., depending on the distance to the IR-HA 104 from which the packets were received). Therefore, the MN 100 discovers and bootstraps with a HA 206 (step 402), which is preferably located close to CN 102 and preferably close to the direct path between MN 100 and CN 102. This HA is again a RO-HA as defined in the MN-initiated case (HA2 in FIG. 4). Note that the RO-HA 206 should rather be located close to CN 102 than to MN 100 in order to keep strong location privacy support and prevent frequent bootstrapping in the presence of MN mobility.

After bootstrapping, the MN 100 registers with the RO-HA and starts the return routability procedure with the CN over the reverse tunnel to the RO-HA 206 (step 403). The MN uses the IR-HoA (HoA1) as HoA and the RO-HoA (HoA2) as CoA in CoTi and BU messages and sends those messages to the CN 102 over the reverse tunnel to RO-HA 206. BU messages sent to HAs still contain the "real" CoA. Hence, data packets sent by CN 102 (step 404) are routed to RO-HA 206 using the type 2 routing header and tunnelled to the MN 100 including the routing header. Hence, from CN's point of view the MN 100 is located in the network of RO-HA 206. Consequently, the route is now optimized without breaking the session and location privacy is provided. Since neither HAs nor CNs have to be modified, the solution is easy to deploy and no transition issues arise.

Figure 5:
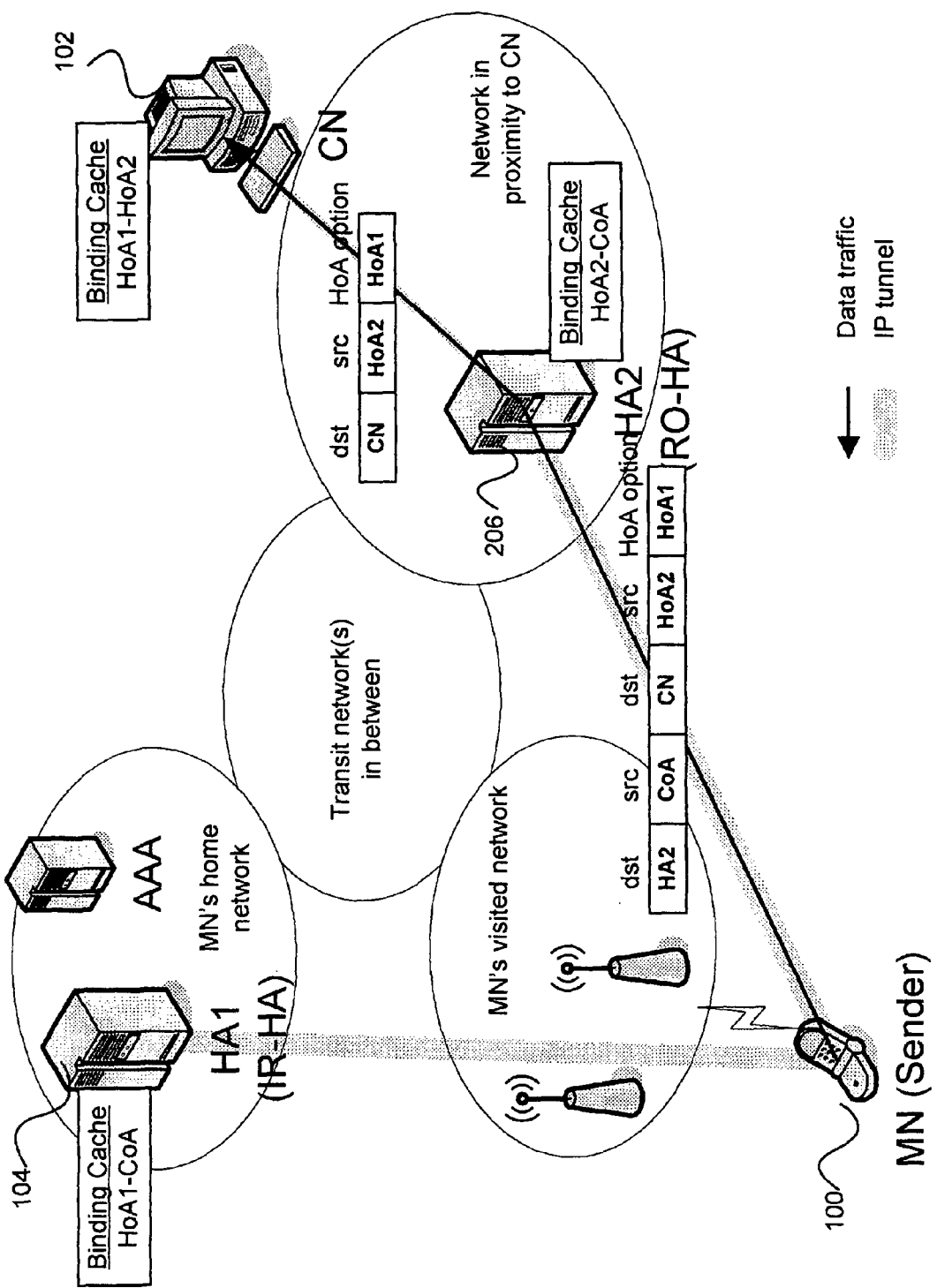
FIG. 5 shows the data path and addresses in IP headers for CN-initiated session if MN sends data according to an embodiment of the invention.

FIG. 5 shows the path and addresses in case the MN sends data packets over the reverse tunnel to the RO-HA (HA2) 206. The packets contain the IR-HoA (HoA1) in the HoA option and RO-HoA (HoA2) 206 as source address in the inner IP header. Note that this is different from RFC3775, which prescribes that the CoA is used as source address in route optimization mode.

Figure 9:
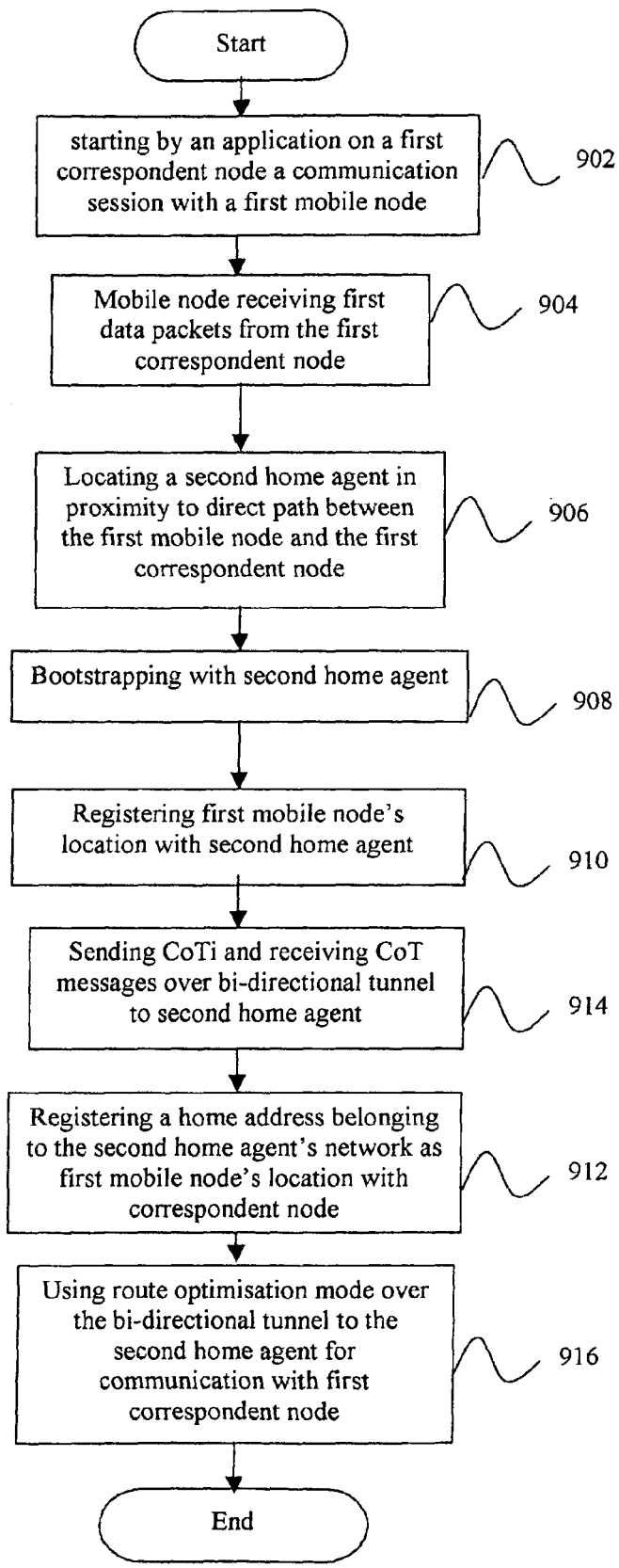
FIG. 9 is a block diagram of the CN initiated process according to an embodiment of the invention.
Figure 10:
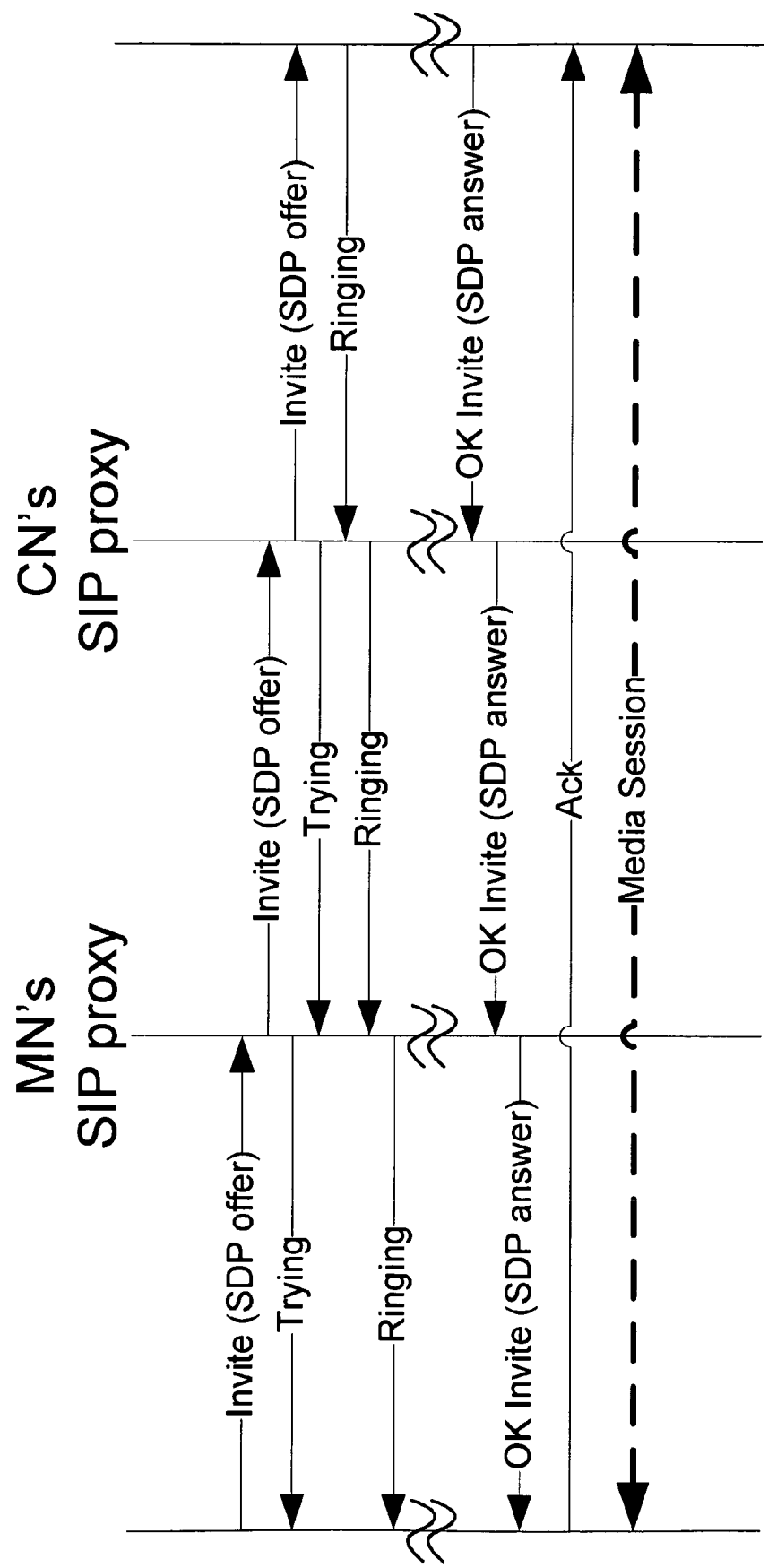
FIG. 10 shows an example of establishment of a communication system using SIP.

FIG. 9 is a flow chart depicting the CN initiated case. After communication is requested in step 902 the MN receives data packets from the first CN in step 904. A second HA in proximity to the direct path between the first MN and first CN is located in step 906 and bootstrapping with the second HA is carried out in step 908. In step 910 the first MN's location is registered with the second HA and a home address belonging to the second HA's network is registered as first MN's location with the CN in step 912. CoT and CoTi messages are sent over the bi-directional tunnel in step 914, and in step 916 route optimization mode is used, both with the MN's second HoA used as CoA.

For subsequent sessions with the same CN or with other CNs in this network or in nearby networks, the tunnel to the RO-HA (HA2) can be re-used. Upon movement, the MN sends BU messages to the IR-HA as well as the RO-HA. However, it does not send a BU message to the CN, as it would usually do in route optimization mode according to RFC3775. Instead, it only sends a BU to CN if it changes the bi-directional tunnel underlying the route optimization mode from RO-HA to another RO-HA (and periodically to prevent the binding lifetime to expire).

In the following a method for optimising the route for a SIP-based Mobile IP data session is described. In the previous embodiment a routing header is required in the CN-initiated scenario, since an ongoing session must be moved from the first to the second home agent. In a further embodiment, a method is described that can get rid of this additional tunnelling overhead if MN and CN use application-level signalling to establish the communication session, e.g., the Session Initiation Protocol (SIP).

Therefore, upon receiving (1104) the SIP invite message from the CN, the MN looks up the CN address in the SDP part of this message and starts discovering a second HA located close to the CN. It then bootstraps with this second HA. During the bootstrapping procedure, the MN obtains a new HoA. The MN puts this new HoA in the SDP part of the "Ok response" message, which is sent back to the CN. The CN then uses this HoA for further signalling and data communication (1114) with the MN and hence uses the optimized route from the beginning. Since the session does not have to be moved from one HA to another, no return routability signalling and no routing header is required.

Figure 11:
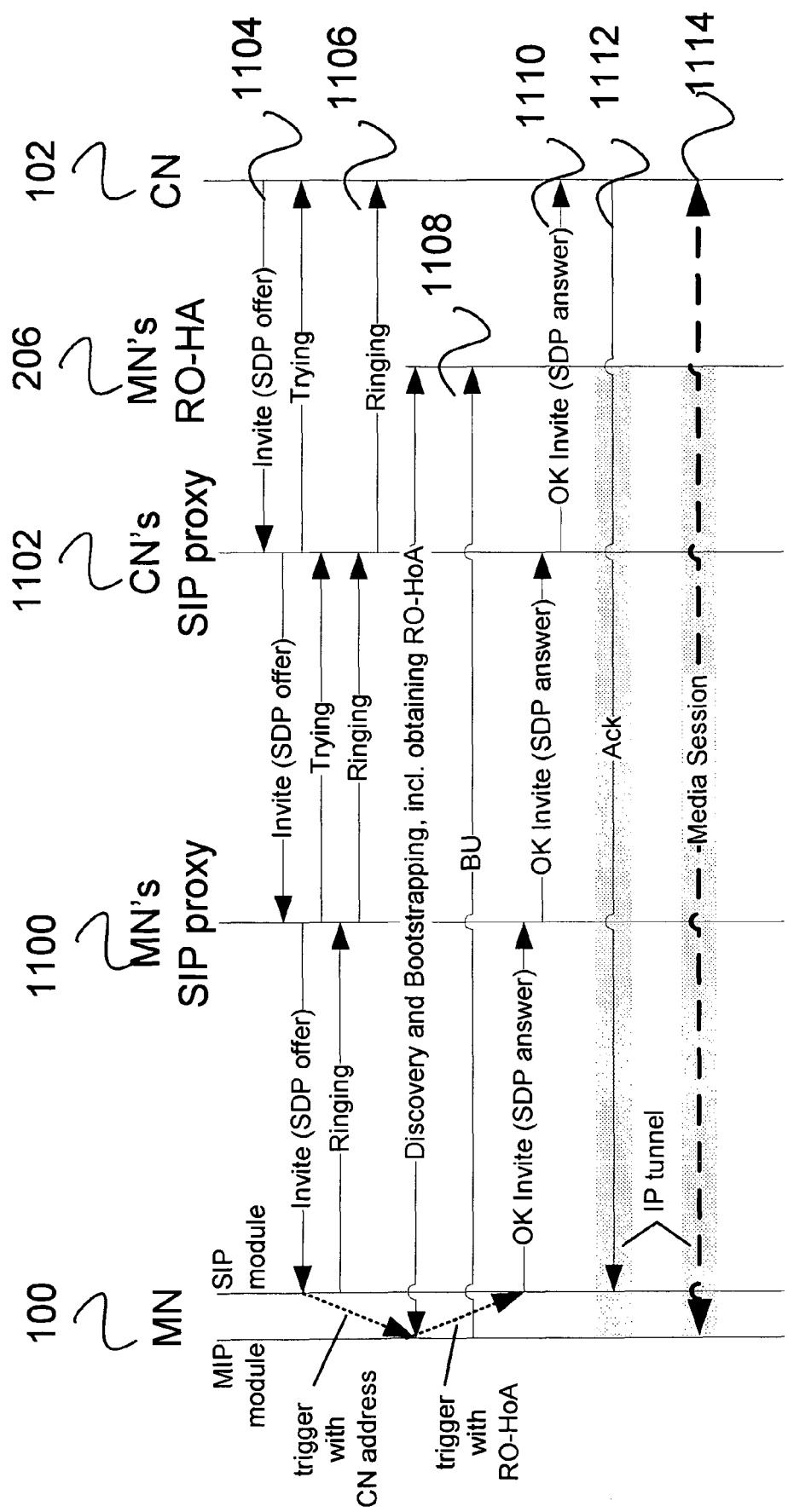
FIG. 11 depicts the signalling flow supporting optimised routing, location privacy and low tunnelling overhead in a CN-initiated communication scenario with SIP-based services according to an embodiment of the invention.
Figure 12:
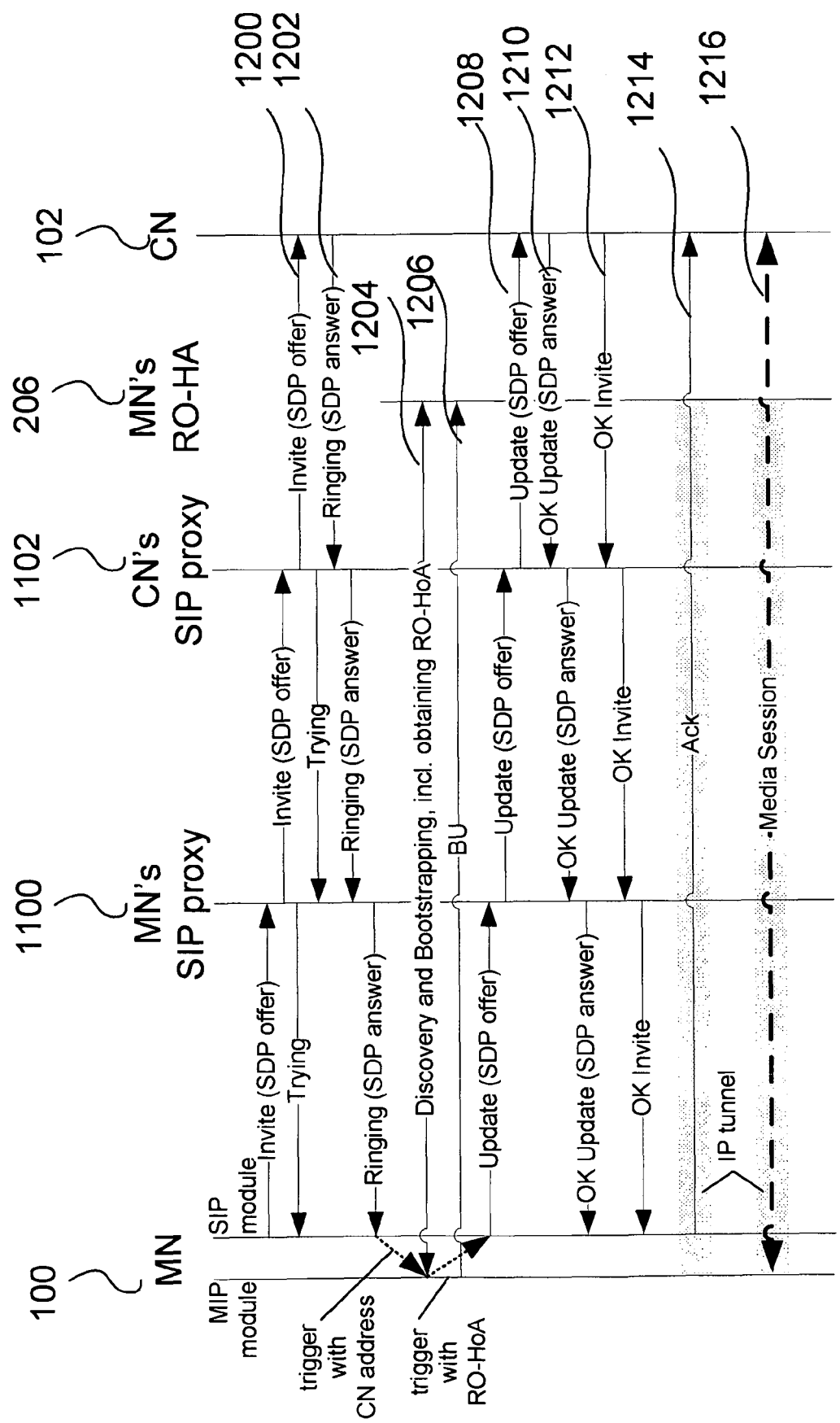
FIG. 12 shows the signalling flow supporting optimised routing, location privacy and fast tunnel establishment in a MN-initiated communication scenario with SIP-based services according to an embodiment of the invention.

The method that can get rid of this additional tunnelling overhead if MN and CN use application-level signalling to establish the communication session is described in more detail below. The main idea is to utilize cross-layer communication between SIP on application layer and Mobile IP (MIP) on network-layer. In the following, the proposed method is described for two scenarios: the CN establishes a session with the MN using the Session Initiation Protocol (SIP) (see FIG. 11) and vice versa (see FIG. 12). It is assumed that the MN is registered via SIP at MN's SIP proxy server and CN is registered via SIP at CN's SIP proxy server.

In the CN-initiated case, the CN starts establishing the session by sending a SIP Invite message (1104) to the MN. Upon receiving the Invite message, the SIP module in the MN looks up the CN address in the SDP offer or in the contact field of the SIP header in this message and gives this address together with a trigger to the MIP module. Upon receiving the trigger, the MIP module (which is extended by the methods described in the previous sections) starts discovering the RO-HA (i.e., a HA located close to the CN). After a successful discovery, the MN bootstraps with this RO-HA. During the bootstrapping procedure, the MN obtains a new home address RO-HoA. This RO-HoA is then given by the MIP module in the MN together with a trigger to the SIP module, which puts the RO-HoA in the SDP answer and/or in the contact field of the SIP header of the next suitable SIP message sent to the CN. This can, e.g., be the Ok Invite message (1110). Consequently, the CN uses RO-HoA as MN address for the session with the MN and the optimized route is used from the beginning of the session, i.e., for the first data packets sent to MN. This also means that the session does not have to be moved from one HA to another as above, i.e., no return routability signalling is required and data packets do not carry a routing header, which significantly reduces the overhead.

Another important application for this embodiment is the following: The MN does not register with any HA as long as no communication session exists. Instead, it first registers with an HA when the MN itself wants to initiate a communication session or when a SIP Invite message is received, i.e., a CN wants to initiate a communication session with the MN. This approach saves a lot of the MN's battery power and a lot of over the air signalling, especially when the MN moves a lot without actually having any communication sessions open.

In case the MN has initiated the session, the method is slightly different. The CN address is obtained by the MN from the SDP answer (1202) of or from the contact field in the SIP header of, e.g., in the Ringing message, and the MIP module is triggered with the CN address after receiving this message. In general, the SDP answer should be delivered to the MN as early as possible to achieve the best optimization. After bootstrapping (1204) with the RO-HA and obtaining the RO-HoA, the MN informs the CN to use this address for the session instead of the address the MN has put in the SDP offer and/or the contact field of the SIP header of the initial Invite message. For this purpose, the MN sends, e.g., a re-Invite message or an Update message (1208) (J. Rosenberg, The Session Initiation Protocol (SIP) UPDATE Method, RFC3311, September 2002) containing the RO-HoA in the SDP offer and/or in the contact field of the SIP header. If the bootstrapping is complete before the Ok Invite message has been received, MN cannot send a re-Invite message. Instead, it can send the Update message containing RO-HoA. If the Ok message is received before the bootstrapping process is complete, the MN can send the re-Invite message containing the RO-HoA. In any case, the MIP bootstrapping process and the SIP session negotiation process can run at least partly concurrently, which means that the optimized route is established earlier than without this optimization.

General Issues and Variants

Below some possible optimizations to the method described above are presented and then further application of the invention that go beyond location privacy are discussed.

Optimisation

Several optimizations are possible to increase the performance of mechanism described in this invention.

Before the optimized route can be used, the RO-HA must first be discovered. To reduce the time needed for this discovery, two options are possible.

Firstly, IR-HA discovers the RO-HA, either based on a configured list of HAs or dynamically, and suggests the RO-HA address to MN. The discovery can already start upon receiving the first data packets from a CN. The suggestion of the RO-HA address can, e.g., be done by sending a trigger message as defined for HA reliability.

Secondly, CN discovers RO-HA, either based on a configured list of HAs or dynamically (e.g., from announcements in local network such as Router Advertisements or DHCP messages), and suggests the RO-HA address to MN. The suggestion of the RO-HA address can, e.g., be done by sending a trigger message as defined for HA reliability.

The optimized route can first be used after the MN has completed the bootstrapping procedure with RO-HA. To reduce this time, the following options are possible.

Firstly, upon receiving first data packet from CN, IR-HA bootstraps with RO-HA on behalf of MN. Subsequently, the parameters and the state of the Ipsec (Internet Protocol security) security associations are transferred from IR-HA to MN. Hence, the time to establish the IPsec security association is reduced.

Secondly, upon receiving first data packet from CN, IR-HA generates and transfers shared session keys together with authorization data to RO-HA. Hence, the time needed to consult AAAH (Authentication, Authorisation and Accounting, Home domain) server is saved.

Thirdly, the return routability procedure with CN can be executed concurrently to the bootstrapping procedure with RO-HA by tunneling CoT/i packets from MN over IR-HA and RO-HA to CN. The corresponding states in RO-HA can be established by IR-HA.

Another point is that operators may want to assist in the decision to optimize the route. Therefore, IR-HA may trigger the MN to optimize the route (e.g., upon receiving first data packets from CN) and bootstrap with RO-HA. Therefore, the trigger messages defined for HA reliability can be re-used.

At the time the session is moved from the non-optimized route to the optimized route, data packets may get lost or re-ordered. This may have a negative impact on the service quality. One option to prevent this for services requiring a call/connection setup signalling exchange (e.g., SIP-based (Signalling Initiation Protocol) services) is to execute the call/connection setup signalling over the non-optimized route in parallel to establishing the optimized route. Only if both processes are complete, the data transfer is started. This can be achieved by introducing a new trigger message indicating that the optimized route is established or by adding this information to the call/connection setup signalling.

If the CN is mobile and far away from its IR-HA, the route is not well optimized. If either IR-HA or RO-HA is a HA of CN, at least one HA knows the CoAs and locations of both MN and CN and hence can discover a new RO-HA which is located in between MN's and CN's visited network. Hence, the session can be moved again to the new RO-HA to further optimize the route.

The situation that MN and CN both are registered at the same HA can happen accidentally or can be forced. A possible option to force this situation is that MN and CN or some entity/entities on behalf of them (e.g., their IR-HAs) negotiate(s) a common HA and trigger their MN/CN to bootstrap with the common HA.

A disadvantage of using route optimization mode over the bi-directional tunnelling mode in the CN-initiated session scenario is the additional overhead caused by the routing header inside the reverse tunnel. Options to get rid of this overhead are, e.g., RO-HA intercepts data packets addressed to RO-HoA, replaces the address in the destination field of the IP header with the address in the routing header and removes the routing header before tunnelling the packet; or the MN uses the RO-HA address as CoA (instead of RO-HoA) and sends BU messages containing <IR-HoA,CoA> to RO-HA. In this case the routing header is automatically removed by RO-HA (since it contains the address of the RO-HA). After removal, the packets are addressed to IR-HoA, which triggers RO-HA to consult its Binding Cache and tunnel the packets to the MN's CoA. However, both options require changes to HA implementations, which are not needed for the basic (unoptimized) method.

Other Applications of this Invention

This invention has broader applicability than only for location privacy. More generally, it enables moving a data session to a new anchor HA without breaking the data session (i.e., without changing the HoA of the session).

Figure 6:
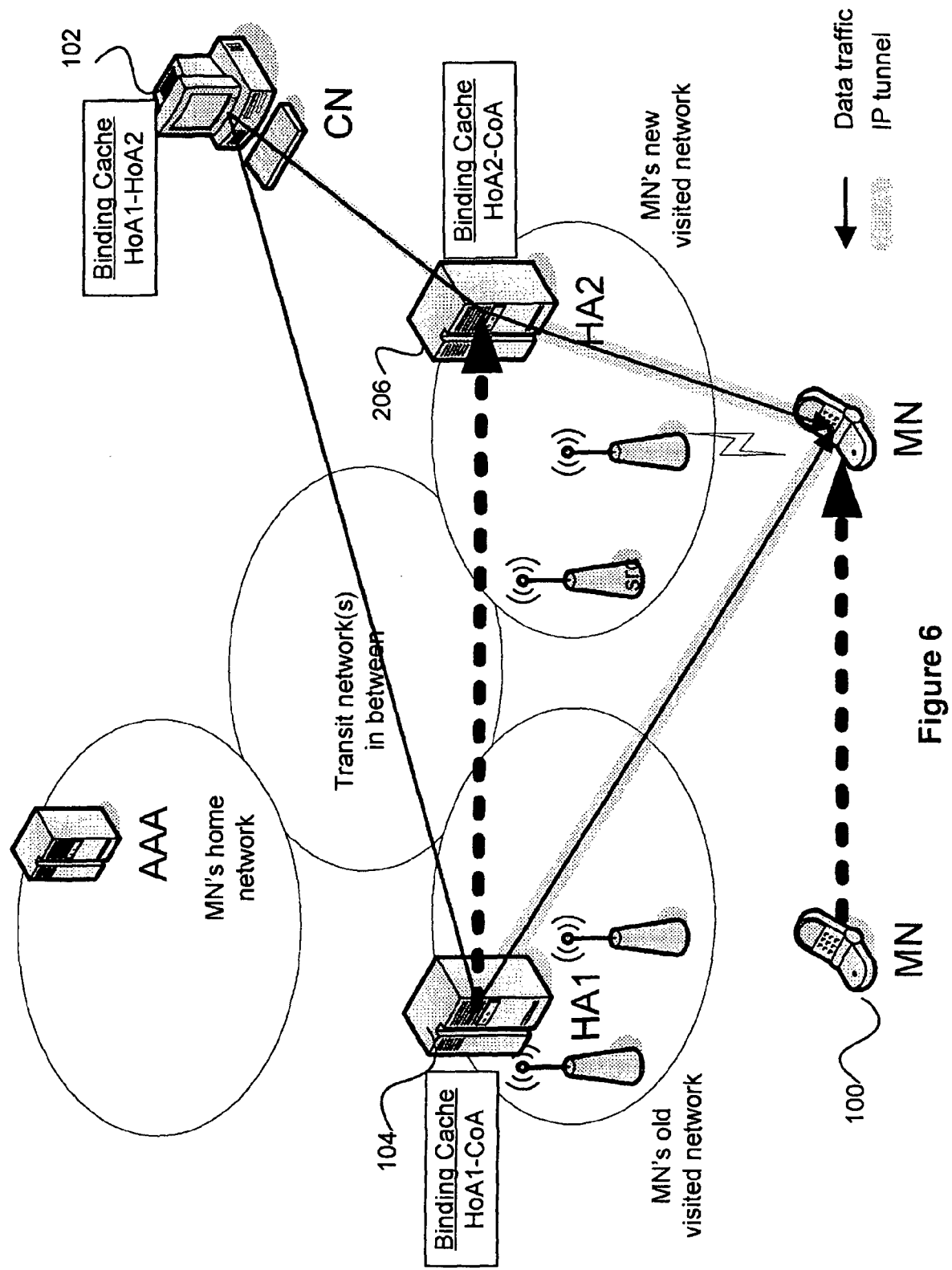
FIG. 6 shows the data path if anchor is moved from one local HA to another local HA according to an embodiment of the invention.

One application is optimized routing in scenarios when MN moves and is able to bootstrap with new (local) HAs upon entering a new network (see FIG. 6). The route in bi-directional tunnelling mode can be optimized by moving the data session from HA1 to HA2 using this invention.

A second application is load balancing for HAs. A highly loaded HA may want to reduce its load and trigger the MN to bootstrap with another HA and move the session to this HA. This invention can be used to move an ongoing data session without breaking it (note that other than in FIG. 6, the MN does not necessarily move in this case). This enables Internet-wide load balancing between HAs located in different networks. RFC3775 only supports load balancing between HAs located in the same network (i.e., on the same link).

The load balancing could further be extended by bootstrapping with multiple HAs and maintaining multiple bi-directional tunnels (each using route optimization mode over bi-directional tunnelling mode). The MN can then send the data packets over those routes, e.g., in a round-robin fashion. However, this requires extensions to RFC3775 currently under development in the IETF monami6 working group, which allow the MN to register multiple CoAs with the CN.

A third application is fault tolerance. When the MN has moved a session from a HA1 to a HA2 by using this invention, HA1 can temporarily go down without interrupting the communication between MN and CN using HoA1. However, HA1 is still needed for routing HoT/HoTi (Home Test/Home Test init) messages, which are needed for updating the binding in CN when the binding lifetime expires or HA2 is changed.

Figure 7:
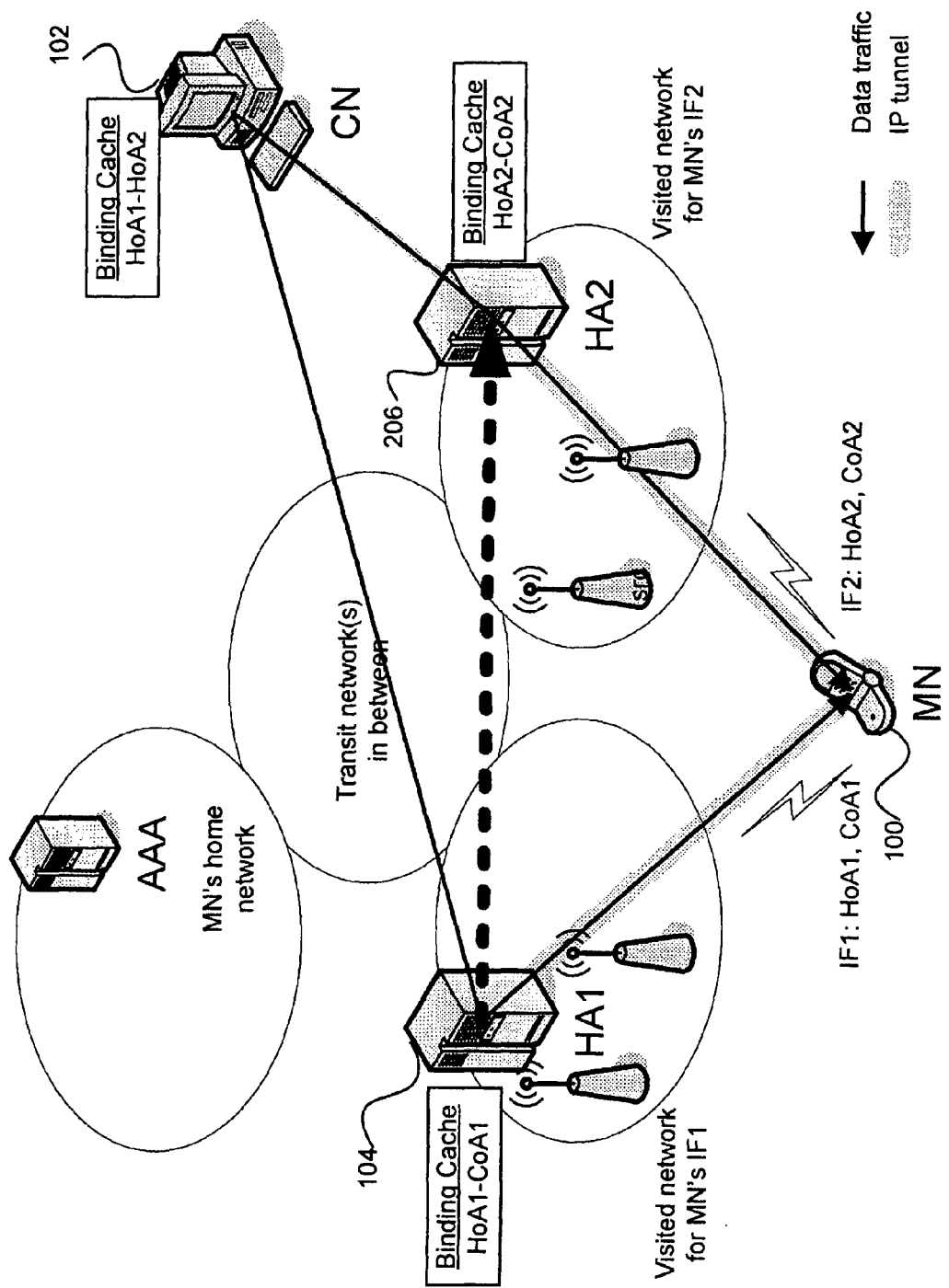
FIG. 7 shows the data path if anchor is moved from one HA to another HA, each registered with a different network interface according to an embodiment of the invention.

A fourth application is to move the data sessions arbitrarily between different network interfaces and the corresponding anchors. For instance, a MN may be equipped with a WLAN (Wireless Local Area Network) and a cellular network (e.g., UMTS, Universal Mobile Telecommunications Standard) interface (IF), the corresponding addresses being registered as HoAs at HA1 and HA2, respectively. Then this invention enables the MN to move ongoing data sessions from the WLAN to the UMTS interface or vice versa by moving the session from HA1 to HA2 or vice versa (see FIG. 7) as described above.

Although this invention is described with respect to a packet-switched system running the Mobile IPv6 protocol, the invention is not limited to this protocol. Instead, it is applicable to systems running any mobility management protocol, which support both routing of data packets through a mobility anchor and routing of data packets without passing through the anchor. One example of such a protocol is Mobile IPv4 [RFC3344] with route optimization extension.

Instead of running on the mobile node, the mobility management protocol can also run on a proxy node without loss of applicability of this invention. In this case, the proxy node executes all necessary actions described in this document including sending location updates to the network on behalf of the mobile node. Examples of such protocols are any kinds of Proxy Mobile (e.g., [K. Chowdhury, "Network Based Layer 3 Connectivity and Mobility Management for IPv4", draft-chowdhury-netmip4-00.txt, February 2006] or [K. Chowdhury, A. Singh, "Network Based Layer 3 Connectivity and Mobility Management for IPv6", draft-chowdhury-net-mip6-00.txt, February 2006]) or protocols proposed and developed in the netimm WG (e.g., [J. Wood, K. Nishida, "Edge Mobility Protocol (EMP)", draft-wood-netimm-emp-base-00.txt, October 2005]).

Another embodiment of the invention relates to the implementation of the above described various embodiments using hardware and software. It is recognised that the various above-mentioned methods, as well as the various logical blocks and modules described above may be implemented where performed using computing devices (processors), as for example general purpose processors, Application Specific Integrated Circuits (ASIC), Field Programmable Gate Arrays (FPGA) or other programmable logic devices, etc. The various embodiments of the invention may also be performed or embodied by a combination of these devices.

Further the various embodiments of the invention may also be implemented by means of software modules which are executed by a processors or directly in hardware. Also, a combination of software modules and a hardware implementation may be possible. The software modules may be stored in any kind of computer-readable storage medium, for example RA, EPROM, EEPROM, flash memory, registers, hard disks, CD-ROM, DVD, etc.

The invention claimed is:

1. A method for routing packets in a system of packet-switched networks comprising a plurality of home agents, at least one mobile node and at least one correspondent node, the mobile node having at least a first home address and communicating with the correspondent node over a first home agent of the plurality of home agents, the method comprising the following steps carried out by the mobile node:
 a) receiving an application layer request message from the correspondent node via the first home agent;
 b) receiving data packets from the correspondent node via the first home agent;
 c) looking up a correspondent node address in a part of the application layer request message;
 d) locating a second home agent of the plurality of home agents in proximity to a direct path between the mobile node and the correspondent node using the correspondent node address;
 e) establishing an optimized route via the second home agent, the establishing step comprising the steps of:
  e1) bootstrapping with the second home agent to obtain a second home address; and
  e2) including the second home address in a part of an application layer response message to the correspondent node to enable the correspondent node to use the second home address for data communications with the mobile node; and
 f) executing an application signaling exchange between the correspondent node and the mobile node via the first home agent,
 wherein the correspondent node starts to transfer the data packets via the optimized route when both of the establishing and the executing steps are completed.

2. The method for routing packets of claim 1, wherein the application layer request message is a session initiation protocol invite.

3. The method for routing packets according to claim 1, wherein the locating of the second home agent in step d) comprises looking up the correspondent node address in a session description protocol part or in a contact field of the application layer request message.

4. The method for routing packets according to claim 1, wherein step e2) comprises including the second home address in a session description protocol part or in a contact field of the application layer response message.

5. The method for routing packets according to claim 1, wherein the application layer response message is a session initiation protocol 200 ok response.

6. A method for routing packets in a system of packet-switched networks comprising a plurality of home agents, at least one mobile node and at least one correspondent node, the mobile node having at least a first home address and communicating with the correspondent node over a first home agent of the plurality of home agents, the method comprising the following steps carried out by the mobile node:
 sending a first application layer request message to the correspondent node;
 receiving an application layer response message from the correspondent node;
 receiving data packets from the correspondent node via the first home agent;
 looking up a correspondent node address in a part of the application layer response message;
 locating a second home agent of the plurality of home agents in proximity to a direct path between the mobile node and the correspondent node using the correspondent node address;
 establishing an optimized route via the second home agent, the establishing step comprising the steps of:
  bootstrapping with the second home agent to obtain a second home address; and
  informing the correspondent node to use the second home address for data communications with the mobile node; and
 executing an application signaling exchange between the correspondent node and the mobile node via the first home agent,
 wherein the correspondent node starts to transfer the data packets via the optimized route when both of the establishing and the executing steps are completed.

7. The method for routing packets according to claim 6, wherein the application layer request message is a session initiation protocol invite.

8. The method for routing packets according to claim 6, wherein the locating step comprises looking up the correspondent node address in a session description part or in a contact field of the application layer response message.

9. The method for routing packets according to claim 6, wherein the application layer response message is a session initiation protocol 200 ok response.

10. The method for routing packets according to claim 6, wherein the application layer response message is a session initiation protocol 180 ringing response.

11. The method for routing packets according to claim 6, wherein the step of informing the correspondent node comprises sending a session initiation protocol re-invite message or a session initiation protocol update message.

12. A mobile node in a system of packet-switched networks comprising a plurality of home agents and at least one correspondent node, the mobile node having at least a first home address and communicating with the correspondent node over a first home agent of the plurality of home agents, the mobile node comprising:
 a receiving unit configured to receive an application layer request message from the correspondent node via the first home agent and further configured to receive data packets from the correspondent node via the first home agent;
 a look up unit configured to look up a correspondent node address in a part of the application layer request message;
 a locating unit configured to locate a second home agent of the plurality of home agents in proximity to a direct path between the mobile node and the correspondent node using the correspondent node address;
 a route optimization establishing unit configured to establish an optimized route via the second home agent, the route optimization establishing unit comprising:
  a bootstrapping unit configured to bootstrap with the second home agent to obtain a second home address; and
  an including unit configured to include the second home address in a part of an application layer response message to the correspondent node to enable the correspondent node to use the second home address for data communications with the mobile node; and
 an application signaling exchange executing unit configured to execute an application signaling exchange between the correspondent node and the mobile node via the first home agent, wherein the correspondent node starts to transfer the data packets via the optimized route when both the optimized route has been established and the application signaling exchange has been executed.

13. The mobile node according to claim 12 wherein the application layer request message is a session initiation protocol invite.

14. The mobile node according to claim 12, wherein the look up unit is further configured to look up the correspondent node address in a session description protocol part or in a contact field of the application layer request message.

15. The mobile node according to claim 12, wherein the second home address is included in a session description protocol part or in a contact field of the application layer response message.

16. The mobile node according to claim 12, wherein the application layer response message is a session initiation 200 ok response.

17. A mobile node in a system of packet-switched networks comprising a plurality of home agents and at least one correspondent node, the mobile node having at least a first home address and communicating with the correspondent node over a first home agent of the plurality of home agents, the mobile node comprising:
- a transmission unit configured to send an application layer request message to the correspondent node;
- a receiving unit configured to receive an application layer response message from the correspondent node and further configured to receive data packets from the correspondent node via the first home agent;
- a look up unit configured to look up a correspondent node address in a part of the application layer response message;
- a locating unit configured to locate a second home agent of the plurality of home agents in proximity to a direct path between the mobile node and the correspondent node using the correspondent node address;
- a route optimization establishing unit configured to establish an optimized route via the second home agent, the route optimization establishing unit comprising:
    - a bootstrapping unit configured to bootstrap with the second home agent to obtain a second home address; and
    - a transmission unit configured to inform the correspondent node to use the second home address for data communications with the mobile node; and
- an application signaling exchange executing unit configured to execute an application signaling exchange between the correspondent node and the mobile node via the first home agent, wherein the correspondent node starts to transfer the data packets via the optimized route when both the optimized route has been established and the application exchange has been executed.

18. The mobile node according to claim 17, wherein the application layer request message is a session initiation protocol invite.

19. The mobile node according to claim 17, wherein the look up unit is further configured to look up the correspondent node address in a session description protocol part or in a contact field of the application layer response message.

20. The mobile node according to claim 17, wherein the application layer response message is a session initiation protocol 200 ok response.

21. The mobile node according to claim 17, wherein the application layer response message is a session initiation protocol 180 ringing response.

22. The mobile node according to claim 17, wherein the transmission unit is further configured to inform the correspondent node by sending a session initiation protocol re-invite message or a session initiation protocol update message.

23. A system of packet-switched networks comprising a plurality of home agents, at least one mobile node according to claim 12 and at least one correspondent node, the mobile node having at least a first home address and communicating with the correspondent node over a first home agent of the plurality of home agents.

* * * * *